July 9, 1940.  P. S. CLAUS  2,207,340
TOOL FEEDING MECHANISM
Original Filed Oct. 13, 1937
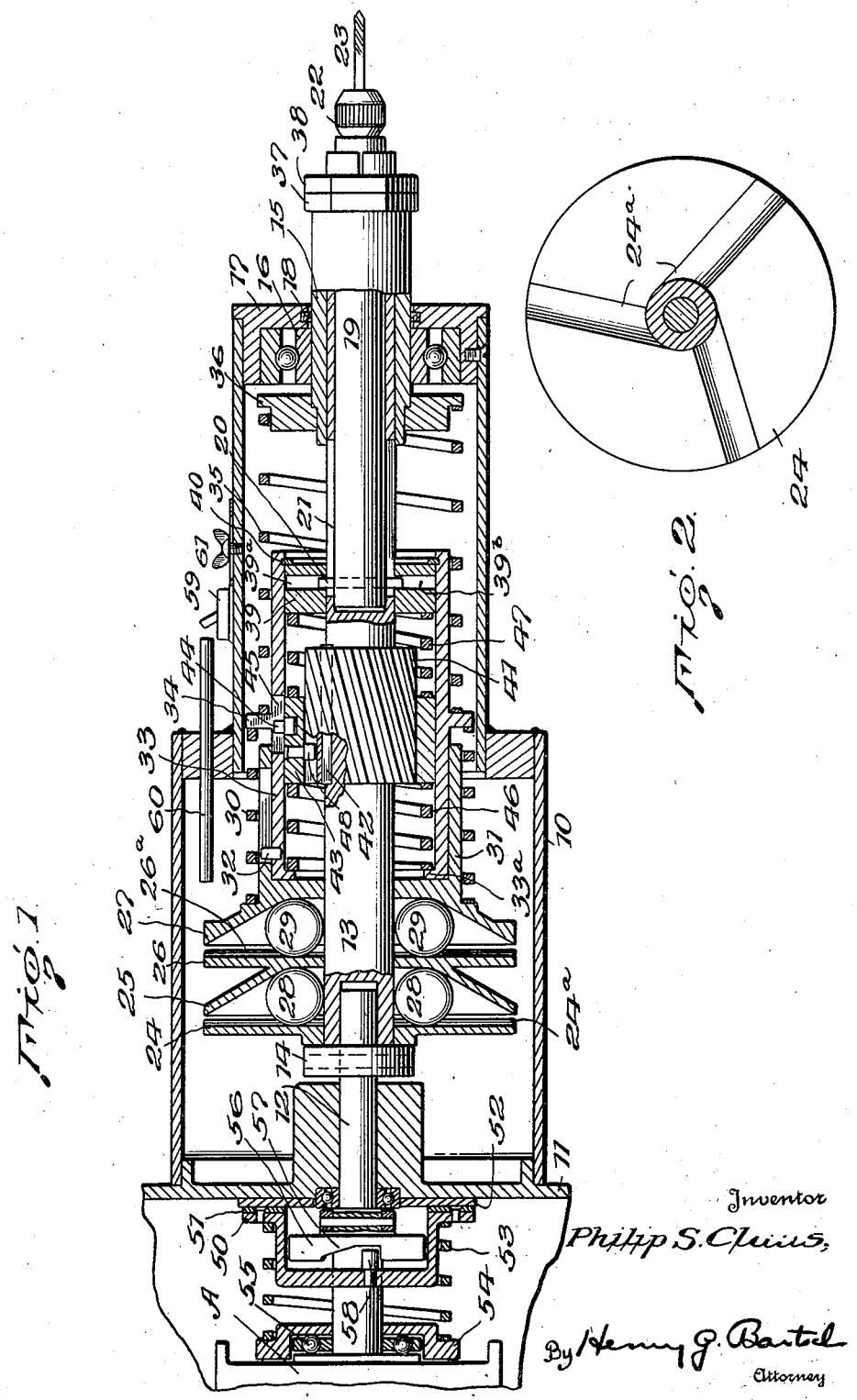
Inventor
Philip S. Claus,
By Henry G. Bartel
Attorney Patented July 9, 1940

2,207,340

UNITED STATES PATENT OFFICE 2,207,340

TOOL-FEEDING MECHANISM

Philip S. Claus, Detroit, Mich., assignor, by direct and mesne assignments, of one-half to Henry G. Bartsch, Washington, D. C., and one-half to Ben J. Chromy, Washington, D. C.

Application October 13, 1937, Serial No. 168,801
Renewed May 11, 1940

15 Claims. (Cl. 77—33)

My invention relates to improvements in tool-feeding mechanism and has to do, more particularly, with the provision of an automatic feed head for rotary drill bits, milling cutters, reamers and the like.

It is well established that the drilling of metal, fibre and similar materials by manual control of feeding is characterized by certain definite objectionable features, among which are low production, operator fatigue, imperfect work, and bit destruction due to overheating and loss of temper.

Because of these recognized features, various types of automatic-feed drilling machines have been devised, some of which are self-controlled hydraulically, and others of which operate mechanically to feed the tool toward the work. While such automatic tool-feeding mechanisms are capable of maintaining the cutter against the work at a substantially constant feeding pressure, all such devices with which I am familiar have the marked disadvantage of being incapable of instantly and accurately compensating for abnormal conditions such as occur when the cutter strikes a hard spot, or when a burr is formed in the work, or, in the case of through drilling, when the bit pierces the work. Some hydraulic mechanisms have been designed to relieve feeding pressure when an abnormal resistance to cutting manifests itself in an overload condition in the rotary drive of the cutter, but, because of unavoidable inertia in the relieving mechanism, are not sufficiently sensitive and responsive to compensate accurately for the occurrence of the abnormal conditions stated.

My invention has, for its primary object, the provision of a feeding mechanism for rotary cutting tools which will adjust feeding pressure of the cutter upon the work in substantially instant accordance with variations in cutting conditions as they occur. Paraphrased, my invention may be said to have, for its main purpose, the provision of a feeding mechanism for rotary cutters, which mechanism is capable of sensitively metering the feed to varying cutting conditions as encountered and without perceptible lag, surge, overcontrol or pendulation.

It is an object of my invention to provide an automatic projecting and feeding mechanism for rotary cutters which is more rapid in the inception of its work than previously devised devices for the same general purpose.

It is an object of my invention to provide an automatic feeding mechanism for rotary cutters which will duplicate or better the quality of work obtainable by expert manual operation in point of speed, perfection of cutting, freedom from the formation of burrs in the work and cutter life.

It is an object of my invention to provide a simple, latchless, automatic feeding mechanism for rotary cutters which will automatically and quickly operate to withdraw the cutter from the work upon the completion of the cutting operation even though the cutter tend to hang therein.

It is an object of my invention to provide an automatic projecting and feeding mechanism for rotary cutters in which projection of the cutter to the work, though rapid, does not initiate drilling at a rate so great as to induce injury to the cutter. A mechanism embodying my invention will satisfactorily handle a #60 drill bit.

It is an object of my invention to provide an automatic feeding mechanism for rotary cutters which permits operation thereof at speeds considerably higher than heretofore regarded as commercially practicable because of generated heat and variable torque stresses in the cutter.

It is an object of my invention to provide a motorized drive for twist drills which will automatically cease rotation and effect retraction of the bit upon completion of each drilling operation.

It is an object of my invention to provide an automatic feeding mechanism for rotary cutters which is compact, light in weight, inherently balanced, readily adjustable to produce cuts of various sizes, which requires little or no lubrication by the user, and which contains no elements subject to rapid wear.

Finally, it is an object of my invention to provide an automatic feeding mechanism for rotary cutters, all the parts of which may be manufactured at low cost by standard automatic machinery and which may be assembled on a production basis by relatively unskilled workers.

Further objects, and objects relating to details and economies of construction and operation will more definitely appear from the detailed description to follow. My invention is clearly defined in the appended claims. Preferred embodiments of my invention are illustrated in the accompanying drawing forming a part of this specification, in which:

Figure 1 is a vertical sectional view of an automatic feed head for twist drills which constitutes what I regard to be a preferred embodiment of my invention; and Figure 2 is a detail view of one disc-like plate forming a part of the centrifugal follow-up mechanism of the illustrated device.

The same reference numerals refer to the same parts throughout the several views.

In a broad sense, my invention may be said to rely, for the attainment of its objects, upon the physical principle that a rotary prime mover or driving member of finite power will vary in speed of rotation, to some extent at least, in proportion to the instant load undertaken. In the case of twist drilling machinery particularly, loads encountered during the drilling operation may, and do, vary widely, due to lack of homogeneity in materials worked upon, the creation of burrs during cutting, and the tendency to overfeed and bind when the drill bit pierces the work. However, twist drills normally operate at very near the maximum safe torque stress therefor and the power and mass of conventional mechanism for rotating such drills is so high, in comparison to the strength of the bit, that the momentary slight drop in speed of rotation induced in the drive by a load in excess of safe limits for the bit is inadequate, in amplitude and duration, for utilization, through a conventional centrifugal-type of feeding mechanism, as a means for controlling feeding pressure in twist drill drives. Recognizing this fact, I have devised a rotary-cutter feeding mechanism in which there is employed a primary feeding mechanism for advancing the cutter into the work and a secondary or compensating mechanism for appropriately augmenting or opposing the feeding pressure exerted by said primary feeding mechanism in accordance with instantaneous increases or decreases in cutter speed which induce, respectively, subnormal or excessive resistance to rotation of the cutter. More specifically, the compensating mechanism which distinguishes my cutter feeding mechanism from all arrangements heretofore suggested in the art consists of what might be termed a floating cam which is sensitively responsive to momentary changes in cutter speed and which acts appropriately, under such a change in speed, to increase or decrease feeding pressure on the cutter in a manner simulating but surpassing, in point of responsiveness, expert manual feeding.

Specifically, and with reference to the accompanying drawing in which I have disclosed one form of my invention as embodied in a feed head for twist drills, there is shown a housing 10 carried upon the front end of the housing 11 of an electric motor, into which housing 10 extends the armature shaft 12 of said electric motor. Within the housing 10, coaxial therewith, is journaled a driving shaft 13, one end of which is coupled to the motor shaft 12 by a conventional pin 14. The forward end of the driving shaft 13 is carried in a sleeve 15, in turn supported by an annular ball bearing 16 retained within the end plate 17 of the housing 10. Suitable packing 18 is interposed between the housing wall 17 and the sleeve 15 to prevent escape of lubricant between the sleeve 15 and the end wall 17. The forward end of the driving shaft 13 is bored to receive a chuck shaft 19 axially movable in the bore of the shaft 13 and retained therein by means of a pin 20 which moves in slots 21 cut in the bored end of the shaft 13. Thus, it will be appreciated, the chuck shaft 19 is rotatively keyed to the armature shaft 12 of the motor, but is susceptible of axial projection or retraction with respect thereto. Automatic means are provided for effecting such projection or retraction of the chuck shaft 19 and is associated conventional chuck 22 and drill bit 23.

In the illustrated embodiment of my invention, the projecting and retracting means operate by reason of centrifugal phenomenon and consist of a plurality of radially converging disk-like plates 24, 25 and 26, 27, which retain, respectively, two series of ball bearings 28, 29.

As will be appreciated from an inspection of Figs. 1 and 2 of the drawing, the plate 24 is freely carried upon the rear end of the shaft 13 in abutment with the enlarged portion thereof which receives the pin 14, and said plate is provided with a plurality of grooves 24ᵃ which extend peripherally outwardly from adjacency with respect to the shaft 13. The courses of these grooves 24ᵃ (see Fig. 2) are non-radial, having a "rake" with respect to true radii passing through their inner limits. Rotatively considered, these non-radial grooves "lag" the said radii in one direction and "lead" the radii in the reverse direction of rotation. Each of these grooves 24ᵃ receives a ball 28 which, when the device is at rest, lies adjacent the shaft 13, due to the conical configuration of the coacting plate 25 and the stress exerted by a spring 30. The plates 25 and 26 are, in reality, integral, having a common base portion at their inner extremity. The plate 26 is provided with grooves 26ᵃ similar in size and arrangement to those 24ᵃ of the plate 24, and receive a second series of ball bearings 29 which are urged radially inwardly, when the device is at rest, by the spring 30. The plate 27 is, like the plate 25, conical in form and freely carried by the shaft 13. A cylindrical flange 31 on the conical disk 27 extends forwardly therefrom, within and supporting the spring 30. This cylindrical flange 31 is slotted parallel to the axis of the shaft 13 and receives, slidably, a pin 32 carried by a cylindrical casing 33, the rear end of which is snugly disposed in the cylindrical flange 31. A radial flange 34 is also provided on the casing 33, which flange serves as an abutment for the forward end of the spring 30, as well as an abutment for the rear end of a main spring 35, the front end of which abuts a collar 36 carried by the sleeve 15 which is, in turn, held upon the bored end of the shaft 13 by a pair of adjustable assembly nuts 37, 38. As will be appreciated from an inspection of Fig. 1 of the drawing, the balls 28 and 29 will be urged to assume the position illustrated, when the device is at rest, through the medium of the springs 30 and 35, held under compression by the shaft 13 and associated parts.

A collar 39 is retained in the cylindrical casing 33 by means of a conventional split washer 40, and this collar 39 is provided with an aperture 39ᵃ through which the pin 20 may be introduced to assemble the shafts 13 and 19. Preferably, a second bore 39ᵇ is formed in the collar 39 at a point opposite the bore 39ᵃ for the purpose of balancing the collar and facilitating removal of the pin 20 with a pin punch. A spiral-cut gear or external worm 41 is pressed upon the shaft 13 and keyed thereto, intermediate the ends of the cylindrical casing 33, by means of a conventional key 42, which insures co-rotation of worm 41 and shaft 13. A floating sleeve 43 is snugly received within the cylindrical casing 33 and keyed thereto for co-rotation by means of a pin 44 disposed in a slot 45 of the cylindrical casing, permitting relative axial movement between said sleeve and casing. A pair of similar springs 46, 47 are disposed in abutment with the rear and forward ends of the sleeve 43 and abut, respectively, a flange 33ᵃ of the casing and the collar 39, normally tending to maintain said floating sleeve 43 centrally disposed with respect to said flange 38ª and collar 39. The sleeve 43 is engaged with the worm 41 by means of radially-inwardly extending teeth or pins one of which is revealed and designated 48.

Means are provided, in the device disclosed, for magnifying the sensitivity of the device to overload conditions encountered by the drill bit during cutting. In the disclosed embodiment of my invention, this means comprises what I shall designate as an inertia brake, which brake consists of a cup-like brake shoe 50, faced with an anti-friction washer 51 which bears upon a plate 52 secured to the inner surface of the motor housing 11. The shoe 50 carries a spring 53 which abuts a ring member 54 carried upon a conventional ball bearing 55 which, in turn, abuts the end of the armature A of the electric motor. Thus, the lining 51 of the shoe 50 is normally urged to frictional engagement with the plate 52. Means are provided for effecting disengagement of the brake upon acceleration of the motor shaft 12, which means consists of a cam member 56 provided with two or more cam surfaces 57 engageable with pins 58 carried by the shoe 50. As will be appreciated, when the motor accelerates, the pins 58 will be caused to ride up upon the cam surfaces 57 by reason of the drag and inertia of the shoe 50.

Means are also provided for automatically interrupting the supply of electricity to the motor at the completion of each drilling operation. This means consists, in the illustrated embodiment of my invention, of a plunger rod 60 slidably disposed through the housing 10 and urged, by the duly projected plate 27, into tripping engagement with a snap switch 59 which controls the motor circuit. For the purpose of enabling adjustment of the moment of current interruption with respect to the completion of the drilling operation, the base of the snap switch 59 is slotted and is attached to the housing 10 by means of a wing bolt 61.

The operation of the device is as follows: As indicated in the broad statement of the invention, maintenance of the drill bit in contact with the work is effected through a follow-up mechanism, in the illustrated embodiment, consisting of a centrifugal arrangement generally similar to that commonly employed in centrifugal governors. Accurate control of bit-feeding pressure is principally effected, however, by means of an inertia member sensitive to instant changes in the speed of bit rotation which evidence overload or underload upon the bit during its cutting operation. More specifically, upon initiation of rotation effected by closing the switch 59, the pins 58 of the brake ride up upon the cam surfaces 57, disengaging the brake. Assuming, as is generally the case, that the bit 23 is initially spaced at some distance from the work to be drilled, projection of the bit to and into the work is effected by forward movement of the collar 39 keyed to the shaft 19. Such initial projection of the collar 39 is obtained, in the device illustrated, by two structurally distinct mechanisms, one of which is extremely sensitive to accelerative and decelerative rotation of the shaft 13, and the other of which is, relatively considered, less sensitive to such effects and functions rather as a follow-up mechanism for the first.

Under normal drilling conditions these two mechanisms operate more or less jointly to feed the bit forwardly. Projection of the collar 39 by either of the two mechanisms is effected through the axially movable sleeve 43 and spring 47. When, as in starting or in eased resistance to bit rotation, the shaft 13 and its integral worm 41 rotatively overruns the floating sleeve 43, the teeth 48 engaged with the splines thereof are caused to ride projectively therein, urging the sleeve 43 forwardly and increasing the feeding pressure of the bit upon the work. Similarly, the disc 27, being integral with the cylindrical flange 31 and keyed to the floating sleeve 43 through the parts 32, 33 and 44, rotates with the shaft 13 and imparts such rotation to the balls 28, 29 and co-operative plates 26, 25, 24 through the frictional association of these parts provided by the springs 30 and 35. Such induced orbital rotation of the balls 28, 29 about the axis of the shaft 13 induces centrifugal migration thereof with attendant spacing of the plates 24—25 and 26—27. The plate 27 is, accordingly, projected against the resistance of the springs 30 and augments or "backs up" the feeding pressure provided by the pins 48 and splines of the worm 41.

Inasmuch as the feeding pressure developed by the floating sleeve 43 is due to momentary unbalance and therefore may be of short duration, rapid follow-up action by the plate 27 is of great importance. Conventional centrifugal governors are provided with movable weights or "fly balls" which are constrained to shift radially. While such prior-art equipment suffices for use in many control mechanisms, it is essentially slow in responsiveness, due to friction and inertia of the parts. It is a salient feature of my invention to provide a centrifugal type of thrust-producing mechanism in which the inertia of the parts, instead of being a handicap, is utilized to advantage to provide increased sensitivity to rotative acceleration and deceleration.

For an understanding of the operative principle of my centrifugal thrust-producing mechanism, I make reference to Fig. 2 which is a sectional view disclosing the front face of the plate 24. This plate, in the illustrated device, rotates counter-clockwise and the grooves 24ª, which guide the balls 28 in their centrifugal-centripetal movements, are non-radial, having a pronounced "rake" or lag (rotatively considered) with respect to true radii passing through their inward limits. If one visualize such a plate 24 (carrying a loose ball in each groove 24ª) suddenly accelerated in counter-clockwise rotation, it will be appreciated that the balls, having inertia, will lag in rotation and will, due to such lag, approach the periphery of the plate far more rapidly and forcefully than were they constrained to move in conventional, truly-radial courses. Conversely, assuming that the said plate and balls were rotating counter-clockwise at a constant speed and the plate were suddenly checked and decelerated in its rotation, the overrun of the balls would urge these centripetally along the grooves 24ª, in opposition to the basic tendency of such orbitally-rotating members to fly outward by reason of the centrifugal force inherent thereto.

Applying this explained principle to the present device operating at a moment when the shaft 13 is accelerating, the inertia of the balls 28, 29 provides a rapid follow-up action in the plate 27, which, transmitted to the shoulder 34 of the member 33 either by direct abutment of the latter or through the spring 30, relaxes the resistance of the main spring 35 to projection of the bit-shaft 19. Such a follow-up action, induced by inertia of the balls 28 and 29 and accelerated rotation of the shaft 13, finally resolves itself, upon the attainment of a sustained constant rate of rotation, into a projective force which is truly proportional to the centrifugal force generated by the simple orbital rotation of the balls 28, 29 and serves to fed the bit 23 into the work at a definite, generally constant pressure. Under such a condition of constant-speed rotation the floating sleeve assumes a position of static balance between the springs 46 and 47.

Theoretically, it might seem that, for the remainder of the drilling cycle, the feeding of the bit would be effected solely by the projective effort provided by the centrifugal balls 28, 29 and the radially converging plates 24—25 and 26—27. In actual operation, however, such is not the case. No metal is strictly homogeneous, and no drill bit cuts evenly and clears its chips evenly. Moreover, where the machine is doing "through drilling," the final portion of the operation partakes of a punching action and the bit usually overfeeds, overloads and produces a bad burr on the rear face of the work. It is these factors which bring the floating cam mechanism into repeated play during drilling.

Let us assume, now, that for one of these reasons the drill bit 23 is subjected to a sudden overload which manifests itself in a slight but rapid drop in speed of rotation of the shafts 19, 13 and co-rotated worm 41. The floating sleeve, rotatively coupled to the members 23 and 31—27, will tend to overrun the worm 41 and a camming action will occur between the sleeve pins 48 and the pin-engaged splines of the worm 41. Instantly a retractive pressure is transmitted to the cylindrical casing 33 through the spring 46 and—if the overload is especially heavy—even through the pin 44 in reaching its limit of travel in the slot 45. More than this, the balls 28, 29 thereupon tend to overrun plates 24, 25, 26, 27 which follow the shaft 13 in its deceleration and, as has been explained, the inclination of the grooves 24ª, 26ª with respect to true radii is conducive to centripetal shifting thereof relieving the opposition of the plate 27 to retraction under the joint efforts of the main spring 35 and the spring 46 compressed by the cam-retracted floating sleeve 43. Thus, it will be understood, the floating cam and the disclosed novel centrifugal follow-up mechanism may, under conditions of heavy overload, operate jointly to accomplish reduction of feeding pressure on the bit while it continues to drill.

While it has been shown that the novel follow-up and floating-sleeve mechanisms of the illustrated machine may operate jointly to produce either relaxation or projective effort upon the drill bit, the effects of these two feed-control mechanisms is not necessarily joint and additive. As has been pointed out, the floating sleeve is by far the more sensitive of the two instrumentalities and where shaft acceleration is sharp, as when the machine is started up, most of the projective effect may be accomplished by the floating sleeve shifting so far as to force the pin 44 into engagement with the forward end of the slot 45 and carry the cylindrical casing 33 forward so suddenly that the pin 32 slides forward in its slot in the cylindrical flange 31. Under such conditions, the main spring 35 is compressed and the spring 30 is relaxed, leaving but slight spring resistance to be overcome by the balls 28, 29 in effecting follow-up motion of the member 31.

Conversely, the device is capable of operating, under some conditions, in such manner that, throughout the actual drilling cycle, the bit-feeding pressure is applied solely or primarily by centrifugal force developed in the orbitally-rotating balls, duly alleviated, intermittently, by repeated retractive efforts developed by the floating cam mechanism as overfeeding manifests itself in decelerative moments of shaft rotation. A similar compensating action which may or may not embrace relief in the centrifugal mechanism also, can take place when the bit pierces the work or strikes a hard spot or burr. From the foregoing, it will be appreciated that practically an infinite number of joint and opposing operative relationships of the two component mechanisms may occur even during a single drilling operation, providing a nicety of bit-feeding control unsurpassed even by the most skillful human operator.

For the purpose of magnifying the drop in shaft speed evidencing an overload upon the bit, the inertia brake, employing the shoe 50, operates to good advantage. A sudden, though slight, drop in speed in the shaft 13 will cause the shoe 50 with its pins 58 to ride down upon the cam surfaces, effecting almost instantaneous engagement of the brake, further reducing the speed of the shaft 13, and inducing full compensation in feeding pressure by the floating sleeve 43. It is to be understood, however, that the braking effect of the facing 51 is not so great as to place the motor under overload, or result in material wear of the facing upon the plate 52. The brake is also so proportioned as to be substantially instantaneously disengaged upon a slight increase in speed, due to alleviation of strain upon the drill bit 23.

When the drill has been projected to the completion of its stroke, the plate 27 will engage the push rod 60, effecting interruption of the current supply to the motor through the medium of the switch 59. Preferably, the switch is so adjusted as to interrupt the circuit at or about the moment drilling has been completed. The drag of the bit in the work after the motor circuit has been broken is sufficient to cause the inertia brake to become effective and, under the urge of the compressed spring 35, the plate 27 and the balls 29 are caused to return to the position illustrated in Fig. 1 with rapidity. The device is then ready for the next drilling operation. It will be noted that, by the use of plates 25, 27 which open rearwardly, as well as the arrangement of the plate-grooves 24ª, 26ª in the raked manner shown, deceleration of the device and pressure exerted by the spring 35 is conducive to rapid return of the parts to starting position. The telescoping arrangement of the plate-flange 31 with the casing 33, and the interposition of the spring 30, precludes any possibility of the loss of one series of balls 28 or 29 by reason of the failure of the plates 24, 25, 26, 27 to return uniformly. Adjustment of the tension of the spring 35 is afforded through the medium of the nuts 37, 38.

The device described represents but one construction of many in which my invention is susceptible of embodiment. It will be appreciated that many changes in shape, form and size will appear to those skilled in the art upon familiarization with the concepts herein disclosed. Means may be provided for lubricating the unit, although experience has demonstrated that initial packing of the unit with a small quantity of lubricant will suffice for a long period of time. Obviously, the inertia brake herein disclosed, while operating to render the device highly accurate in its compensation for abnormal drill conditions, may be eliminated without departing from the spirit of my invention. Similarly, any suitable follow-up mechanism may be employed in lieu of the centrifugal arrangement illustrated. Where extremely rapid restoration of the device to starting position is desired brake means may be incorporated with the device in such manner as to be operative upon completion of the drilling cycle. Alternately, quick-release mechanism may be interposed between the chuck shaft 19 and the driving shaft 13 to effect instantaneous release of the pin 20 by the collar 39. Likewise, automatic disconnection of the motor circuit is not necessary. A clutch might be employed for the same purpose in such a device operated from line shafting. It will also be appreciated that my invention is not limited to embodiment in feed heads for twist drill machinery, but is susceptible of adaptation in reamer drives, milling machines and other cutting equipment. The device may be constructed to effect relief, only, of feeding pressure upon occurrence of overload conditions simply by arranging the floating sleeve, 43, or its equivalent, to react upon the cutter shaft in a retractive direction only. Conversely, the floating sleeve 43, or its equivalent, may be arranged to react upon the cutter shaft solely in a cutter-shaft projection-inducing manner. While I have illustrated a worm and floating sleeve arrangement for effecting compensation, obviously, other forms of inertia members might be employed to effect the same result. While the follow-up mechanism of the illustrated device includes two cone and ball units, one or a plurality of such units might be used, depending upon the stroke desired. Throughout the description and claims, the term "instantaneously" has been employed in its liberal sense implying suddenness of action, inasmuch as mechanical elements having elasticity and finite mass never operate without some time lag.

I claim my invention broadly, as indicated by the appended claims.

What I claim is:

1. A compensating feed mechanism for rotary cutters, comprising: a driving shaft adapted to be rotated, a driven shaft coupled for rotation by said driving shaft and adapted to carry the cutter, said driven shaft being axially movable with respect to said driving shaft to project or retract said cutter with respect to the work to be cut, primary feeding means for exerting projective pressure upon said driven shaft to feed said cutter into said work, and an inertia member floatingly rotated with said shafts, forwardly movable with respect to said driving shaft when suddenly rotatively overrun thereby, rearwardly movable when suddenly underrun by said driving shaft, and coupled to said driven shaft to augment or partially relieve projective pressure induced by said primary feeding means, upon the occurrence of said respective changes in relative speed.

2. A compensating feed mechanism for rotary cutters, comprising: a driving shaft adapted to be rotated, a driven shaft coupled for rotation by said driving shaft and adapted to carry the cutter, said driven shaft being axially movable with respect to said driving shaft to project or retract said cutter with respect to the work to be cut, primary feeding means for exerting projective pressure upon said driven shaft to feed said cutter into said work, and means for appropriately augmenting or partially relieving projective pressure induced upon said driven shaft by said primary feeding means, upon the occurrence, respectively, of underload or overload upon said cutter, said last-mentioned means comprising a cam and cam-engaged member, one of which members is rotated with said driving shaft and the other of which floats axially on the first and is coupled to said driven member to impart additional feeding pressure thereto upon acceleration of the driving shaft and oppose feeding of the cutter upon deceleration thereof.

3. A compensating automatic feed mechanism for rotary cutters, comprising: a driving shaft, a driven shaft coupled for rotation by said driving shaft and adapted to carry the cutter, said driven shaft being axially movable with respect to said driving shaft to project or retract said cutter with respect to the work to be cut, automatic means for feeding the driven shaft and its cutter toward the work at a normal pressure, and means for instantaneously relieving said pressure upon said driven shaft, said last-mentioned means comprising a floating inertia member rotated with said driving shaft and effective, upon a sudden drop in speed therein evidencing overload on said cutter, to impart to said driven shaft a counter pressure adequate to temporarily relieve said cutter for the duration of said overload.

4. A compensating automatic feed mechanism for rotary cutters, comprising: a driving shaft, a driven shaft coupled for rotation by said driving shaft and adapted to carry the cutter, said driven shaft being axially movable with respect to said driving shaft to project or retract said cutter with respect to the work to be cut, automatic means for feeding the driven shaft and its cutter toward the work at a normal pressure, and means for instantaneously relieving said pressure upon said driven shaft, said last-mentioned means comprising an inertia brake operative by a sudden drop in speed in said driving shaft to supplement said speed drop, and a floating inertia member rotated with said driving shaft and effective, upon such drop in shaft speed, to impart to said driven shaft a counter-pressure adequate to relieve said cutter for the duration of said overload.

5. A compensating automatic feed mechanism for rotary cutters, comprising: a driving shaft, a driven shaft coupled for rotation by said driving shaft and adapted to carry the cutter, said driven shaft being axially movable with respect to said driving shaft to project or retract said cutter with respect to the work to be cut, centrifugal feeding means for exerting projective pressure upon said driven shaft to advance said cutter into the work as the cutter is rotated, and means for instantaneously partially relieving or augmenting centrifugally-generated feeding pressure upon the occurrence, respectively, of a sudden overload or underload on said cutter, said last-mentioned means comprising a floating inertia member rotated with said driving shaft, axially coupled to said driven shaft and effective, when suddenly rotatively overrun or underrun thereby, to respectively augment or oppose projective effort developed by said centrifugal feeding means.

6. A compensating automatic feed mechanism for rotary cutters, comprising: a driving shaft, a driven shaft coupled for rotation by said driving shaft and adapted to carry the cutter, said driven shaft being axially movable with respect to said driving shaft to project or retract said cutter with respect to the work to be cut, centrifugal feeding means for exerting projective pressure upon said driven shaft to advance said cutter into the work as the cutter is rotated, means for instantaneously partially relieving or augmenting centrifugally-generated feeding pressure upon the occurrence, respectively, of a sudden overload or underload on said cutter, said last-mentioned means comprising a floating inertia member rotated with said driving shaft, axially coupled to said driven shaft and effective, when suddenly rotatively overrun or underrun thereby, to respectively augment or oppose projective effort developed by said centrifugal feeding means, and an inertia brake for said driven shaft automatically effective, upon sudden increase in shaft speed, to effect further speed reduction therein until excess cutter load is relieved.

7. A compensating automatic feed mechanism for rotary cutters, comprising: a driving shaft, a driven shaft coupled for rotation by said driving shaft and adapted to carry the cutter, said driven shaft being axially movable with respect to said driving shaft to project or retract said cutter with respect to the work to be cut, centrifugal feeding means for exerting projective pressure upon said driven shaft to advance said cutter into the work as the cutter is rotated, and means for instantaneously partially relieving or augmenting centrifugally-generated feeding pressure upon the occurrence, respectively, of a sudden overload or underload on said cutter, said last-mentioned means comprising a floating sleeve keyed for spiral movement on said driving shaft and effective, when suddenly rotatively overrun or underrun thereby, to respectively assist or oppose projective effort developed by said centrifugal feeding means.

8. A compensating automatic feed mechanism for rotary cutters, comprising: a driving shaft, a driven shaft coupled for rotation by said driving shaft and adapted to carry the cutter, said driven shaft being axially movable with respect to said driving shaft to project or retract said cutter with respect to the work to be cut, centrifugal feeding means for exerting projective pressure upon said driven shaft to advance said cutter into the work as the cutter is rotated, and means for instantaneously partially relieving or augmenting centrifugally-generated feeding pressure upon the occurrence, respectively, of a sudden overload or underload on said cutter, said last-mentioned means comprising a floating sleeve keyed for spiral movement on said driving shaft, resiliently coupled to said driven shaft and effective, when suddenly overrun or underrun thereby, to respectively assist or oppose projective effort developed by said centrifugal feeding means.

9. A compensating automatic feed mechanism for rotary cutters, comprising: a driving shaft, a driven shaft coupled for rotation by said driving shaft and adapted to carry the cutter, said driven shaft being axially movable with respect to said driving shaft to project or retract said cutter with respect to the work to be cut, centrifugal feeding means for exerting projective pressure upon said driven shaft to advance said cutter into the work as the cutter is rotated, and means for instantaneously partially relieving or augmenting centrifugally-generated feeding pressure upon the occurrence, respectively, of a sudden overload or underload on said cutter, said last-mentioned means comprising a worm on said driving shaft and rotated therewith, a sleeve member engaged with said worm for rearward projection when underrun thereby and forward projection when overrun thereby, and a spring abutting each end of said floating sleeve, coupled to said driven shaft, and effective to resiliently impart compensating pressure to said driven shaft.

10. A compensating automatic feed mechanism for rotary cutters, comprising: a driving shaft, a driven shaft coupled for rotation by said driving shaft and adapted to carry the cutter, said driven shaft being axially movable with respect to said driving shaft to project or retract said cutter with respect to the work to be cut, a pair of radially outwardly converging disk-like plates carried on the shaft axis, one of which is limited against axial movement and the other of which is coupled to said driven shaft, centrifugal fly weights disposed between said plates and progressively effective when rotated to force said plates apart and project said driven shaft, and means for imparting rotation to said weights comprising a worm member and a worm-engaged member axially shiftable with respect thereto, one of which members is rotatable with the cutter and the other of which is coupled to rotate one of said plates.

11. A compensating automatic feed mechanism for rotary cutters, comprising a driving shaft, a driven shaft coupled for rotation by said driving shaft and adapted to carry the cutter, said driven shaft being axially movable with respect to said driving shaft to project or retract said cutter with respect to the work to be cut, a pair of radially outwardly converging disk-like plates carried on the shaft axis, one of which is limited against axial movement and the other of which is coupled to said driven shaft, centrifugal fly weights disposed between said plates and progressively effective when rotated to force said plates apart and project said driven shaft, and means for imparting rotation to said weights and instantaneously compensating for sudden overload on said cutter, said last-mentioned means comprising a worm on said driving shaft and rotated therewith, a sleeve member carried by one of said plates in yielding axial abutment therewith, and means on said sleeve in engagement with said worm and effective, therethrough, to resiliently impart rotation and feed-resisting pressure to said associated plate in accordance with operating conditions.

12. A motorized automatic drive for twist drills and the like, comprising: a motor, a drive shaft rotated by said motor, a chuck shaft coupled for rotation by said drive shaft, said chuck shaft being axially movable with respect to said drive shaft to project or retract a twist drill carried by the chuck, a worm rotated by said drive shaft, a floating sleeve engaged with said worm and said chuck shaft, said sleeve having the characteristic of exerting a projective or retractive effort upon said chuck shaft when suddenly rotatively overrun or underrun, respectively, by said worm, and a follow-up mechanism active during rotation of said drive shaft to impart positive projective effort upon said chuck shaft.

13. A motorized automatic drive for twist drills and the like, comprising: a motor, a drive shaft rotated by said motor, a chuck shaft coupled for rotation by said drive shaft, said chuck shaft being axially movable with respect to said drive shaft to project or retract a twist drill carried by the chuck, quick-acting speed-reducing means for said motor automatically operative upon the occurrence of a sudden overload in the drive, a worm rotated by said drive shaft, a floating sleeve engaged with said worm and said chuck shaft, said sleeve having the characteristic of exerting a projective or retractive effort upon said chuck shaft when suddenly overrun or underrun, and a follow-up mechanism active during rotation of said drive shaft to impart positive projective effort upon said chuck shaft.

14. A motorized automatic drive for twist drills and the like, comprising: a motor, a drive shaft rotated by said motor, a chuck shaft coupled for rotation by said drive shaft, said chuck shaft being axially movable with respect to said drive shaft to project or retract a twist drill carried by the chuck, quick-acting speed-reducing means for said motor automatically operative upon the occurrence of a sudden overload in the drive, a worm rotated by said drive shaft, a floating sleeve engaged with said worm and said chuck shaft, said sleeve having the characteristic of exerting a projective or retractive effort upon said chuck shaft when suddenly overrun or underrun, a follow-up mechanism active during rotation of said drive shaft to impart positive projective effort upon said chuck shaft, and means, automatically effective, at the end of the drilling stroke, to interrupt rotation of the drive shaft by said motor and restore said chuck shaft to initial retracted position.

15. In a centrifugally-operative thrust-producing mechanism for twist drill drives and like apparatus the activating rotation of which embraces moments of acceleration and deceleration, a pair of coaxially-alined relatively-separable thrust members the opposed faces of which converge radially to define a radially-tapering axially-expansible annular pocket for the reception of centrifugally-active wedge elements, a plurality of wedge elements of high mass and spherical form disposed in said pocket, means for imparting orbital rotation to said spherical wedge elements, and means for rendering said spherical wedge elements sharply functionally responsive to momentary speed changes in orbital rotation, said last-mentioned means comprising non-radially extending ball guides uniformly spacing and positively directing thrust-varying travel of said spherical wedge elements on raked centripetal-centrifugal paths.

PHILIP S. CLAUS.